United States Patent
Zou et al.

(10) Patent No.: US 8,074,948 B2
(45) Date of Patent: Dec. 13, 2011

(54) ADJUSTABLE APPARATUS

(75) Inventors: Liu-Jun Zou, Shenzhen (CN); Hui Yu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 102 days.

(21) Appl. No.: 12/650,424

(22) Filed: Dec. 30, 2009

(65) Prior Publication Data

US 2011/0068243 A1 Mar. 24, 2011

(30) Foreign Application Priority Data

Sep. 24, 2009 (CN) .......................... 2009 1 0307668

(51) Int. Cl.
*F16M 11/00* (2006.01)

(52) U.S. Cl. ........ 248/157; 248/132; 248/917; 248/919; 248/404; 248/123.11; 361/679.21

(58) Field of Classification Search .................. 248/157, 248/132, 149, 188.5, 919, 917, 404, 123.11; 361/679.21, 679.22, 679.05
See application file for complete search history.

(56) References Cited

U.S. PATENT DOCUMENTS

| 6,702,238 | B1* | 3/2004 | Wang | 248/125.8 |
|---|---|---|---|---|
| 6,712,321 | B1* | 3/2004 | Su et al. | 248/123.11 |
| 6,918,564 | B2* | 7/2005 | Yen et al. | 248/404 |
| 7,036,787 | B1* | 5/2006 | Lin | 248/676 |
| 7,374,139 | B2* | 5/2008 | Tsai et al. | 248/161 |
| 7,413,150 | B1* | 8/2008 | Hsu | 248/123.11 |
| 7,722,003 | B2* | 5/2010 | Ishizaki et al. | 248/295.11 |
| 7,780,125 | B2* | 8/2010 | Yen et al. | 248/125.1 |
| 7,784,747 | B2* | 8/2010 | Gan et al. | 248/132 |

* cited by examiner

*Primary Examiner* — Anita M King
(74) *Attorney, Agent, or Firm* — Altis Law Group, Inc.

(57) ABSTRACT

An adjustable apparatus includes a bracket, an extendable member, a moving member, and a display supporting mount. The extendable member includes a base portion and a resilient tape portion attached to the base portion. The tape portion is secured to the bracket. The moving member is attached on the base portion. The display supporting mount is secured to the moving member for being secured to a display device, and movable with the moving member.

19 Claims, 5 Drawing Sheets

ADJUSTABLE APPARATUS

BACKGROUND

1. Technical Field

The present disclosure relates to an adjustable apparatus for a display device.

2. Description of Related Art

The display device of an all-in-one computer usually needs to be adjusted. A conventional adjustable apparatus is only used to adjust the viewing angle of the display device of the all-in-one computer, but the height of the display device cannot be changed.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
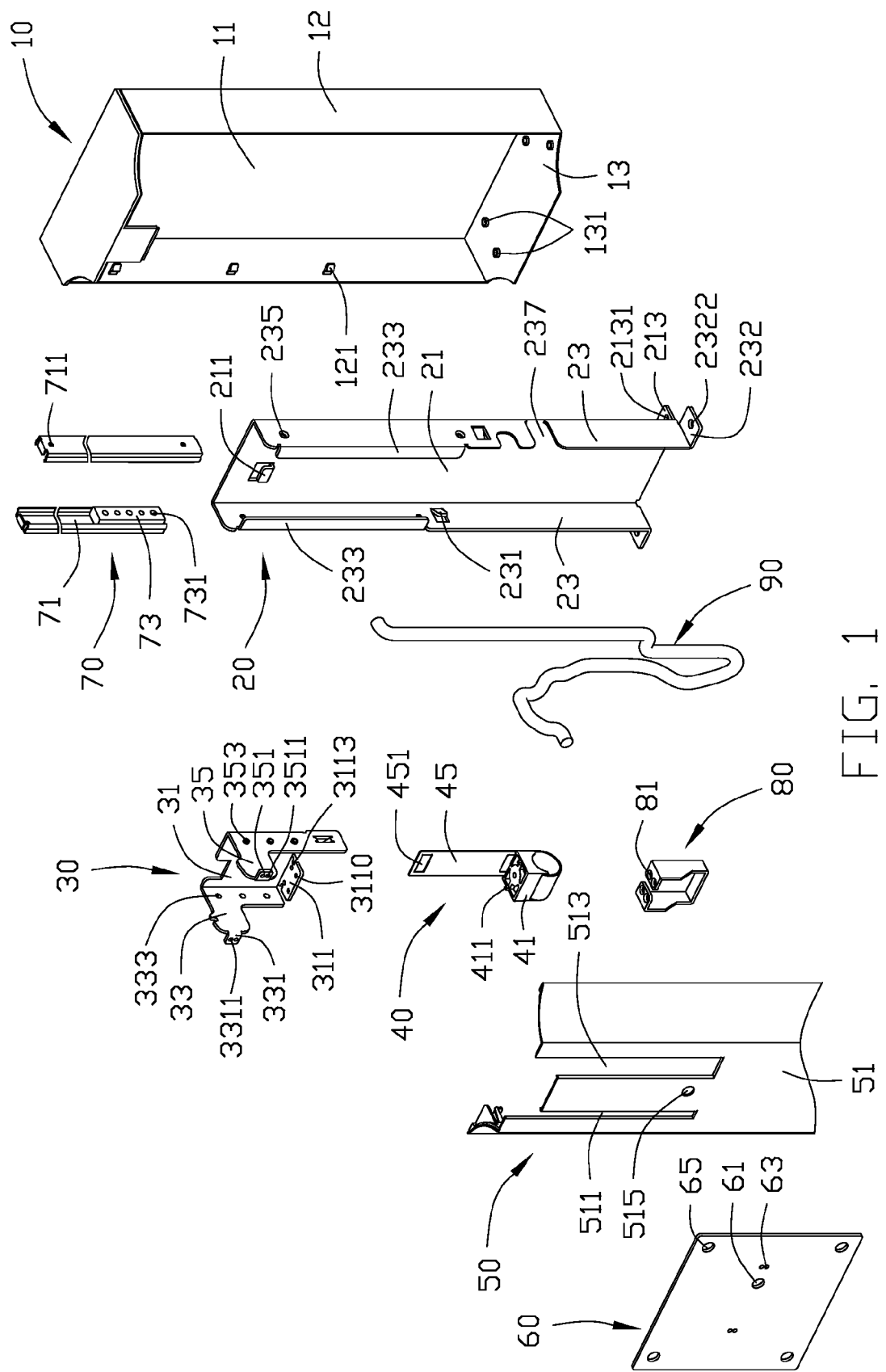
FIG. 1 is an exploded, isometric view of an adjustable apparatus in accordance with an embodiment.
Figure 2:
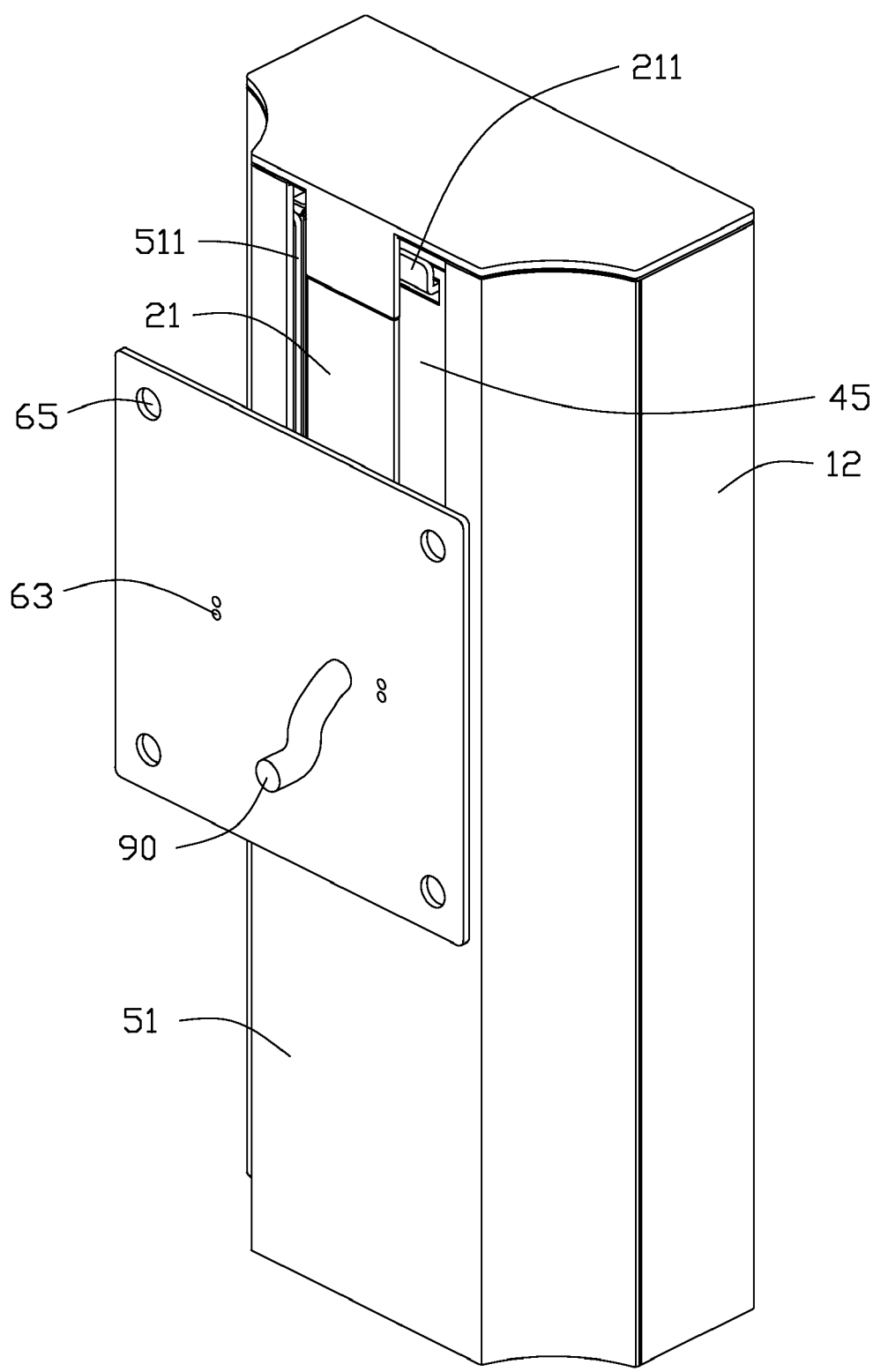
FIG. 2 is an assembled view of the adjustable apparatus of FIG. 1.

Referring to FIGS. 1 and 2, an adjustable apparatus in accordance with an embodiment is capable of adjusting a display device to different positions. The adjustable apparatus includes a chassis 10, a bracket 20, a moving member 30, an extendable member 40, a cover 50, and a display supporting mount 60.

The chassis 10 includes a bottom plate 11, two parallel first side plates 12 perpendicular to the bottom plate 11, and two parallel second side plates 13 perpendicular to the first side plates 12 and the bottom plate 11. Two side plate tabs 121 are located on each first side plate 12. Four second side plate holes 131 are defined in each of the second side plates 13.

The bracket 20 includes a bottom wall 21 and two parallel sidewalls 23 perpendicular to the bottom wall 21. A bottom wall flange 213 is perpendicularly bent away from an of the bottom wall 21 at opposite edges. The bottom wall flange 213 defines two bottom wall flange holes 2131 (only one shown in FIG. 1) corresponding to the two second side plate holes 131 of the chassis 10. A bottom wall clip 211 is located on an inner surface of the bottom wall 21. A sidewall tab 231 is bent inwardly from each sidewall 23. Each sidewall 23 defines two sidewall holes 235. A sidewall piece 232 is perpendicularly bent outwardly from an end of the sidewall 23 adjacent the bottom wall flange 213. Each sidewall piece 232 defines a sidewall piece hole 2322, which is corresponding to the other two side plate holes 131 of the chassis 10. A sidewall flange 233 is perpendicularly bent inwardly from an edge of the sidewall 23, which is parallel to the bottom wall 21. A cutout 237 is defined in one sidewall 23, for receiving a cable 90.

Each sidewall flange 233 and the bottom wall 21 are configured to secure a rail member 70 therebetween. Each rail member 70 includes an outer rail 71 and an inner rail 73. The inner rail 73 is configured to slide on the outer rail 71. Each outer rail 71 defines two outer rail holes 711 corresponding to the sidewall holes 235 of the bracket 20. Two first fasteners (not shown) are fixed in the outer rail holes 711 and the sidewall holes 235, so as to secure the rail members 70 between the sidewall flanges 233 and the bottom wall 21. A plurality of inner rail holes 731 is defined in each inner rail 73.

The moving member 30 includes a main wall 31, and first and second sidewalls 33, 35. A main wall piece 311 is perpendicularly bent from an edge of the main wall 31. A plurality of piece holes 3110 and two piece slits 3113 are defined in the main wall piece 311. The first sidewall 33 defines a plurality of first through holes 333. A first securing portion 331 is bent out from an edge of the first sidewall 33, and two first fixing holes 3311 are defined in the first securing portion 331. The second sidewall 35 defines a plurality of second through holes 353. A second securing portion 351 is bent out from an edge of the second sidewall 35, and defines two second fixing holes 3511.

The extendable member 40 includes a base portion 41 and a resilient tape portion 45 attached to the base portion 41. The tape portion 45 can be resiliently elongated when pulled, and can rebound to shorten when released. Two pins 411 are located on the base portion 41, for engaging in the piece slits 3113. A positioning opening 451 is defined in the tape portion 45.

A positioning member 80 is configured to be secured to the moving member 30 for receiving the base portion 41 of the extendable member 40. A plurality of positioning member holes 81 is defined in the positioning member 80, corresponding to the piece holes 3110 of the moving member 30. A plurality of second fasteners (not shown) is fixed in the positioning member holes 81 and the corresponding piece holes 3110, so as to secure the positioning member 80 to the moving member 30.

The cover 50 is configured to be secured to the chassis 10. A plurality of lock holes (not shown) is defined in cover 50 for receiving the side plate tabs 121 of the chassis 10, so as to secure the cover 50 on the chassis 10. A first sliding slot 511 and a second sliding slot 513 in communication with the first sliding slot 511 are defined in the cover 50. A cover hole 515 is defined in the cover 50 for receiving the cable 90.

The display supporting mount 60 defines a board hole 61 for receiving the cable 90. Four fastening holes 63 are defined in the display supporting mount 60, corresponding to the first and second fixing holes 3311, 3511 of the moving member 30. A plurality of securing holes 65 is defined in corners of the display supporting mount 60, and configured to secure the display supporting mount 60 on a display device (not shown).

Figure 3:
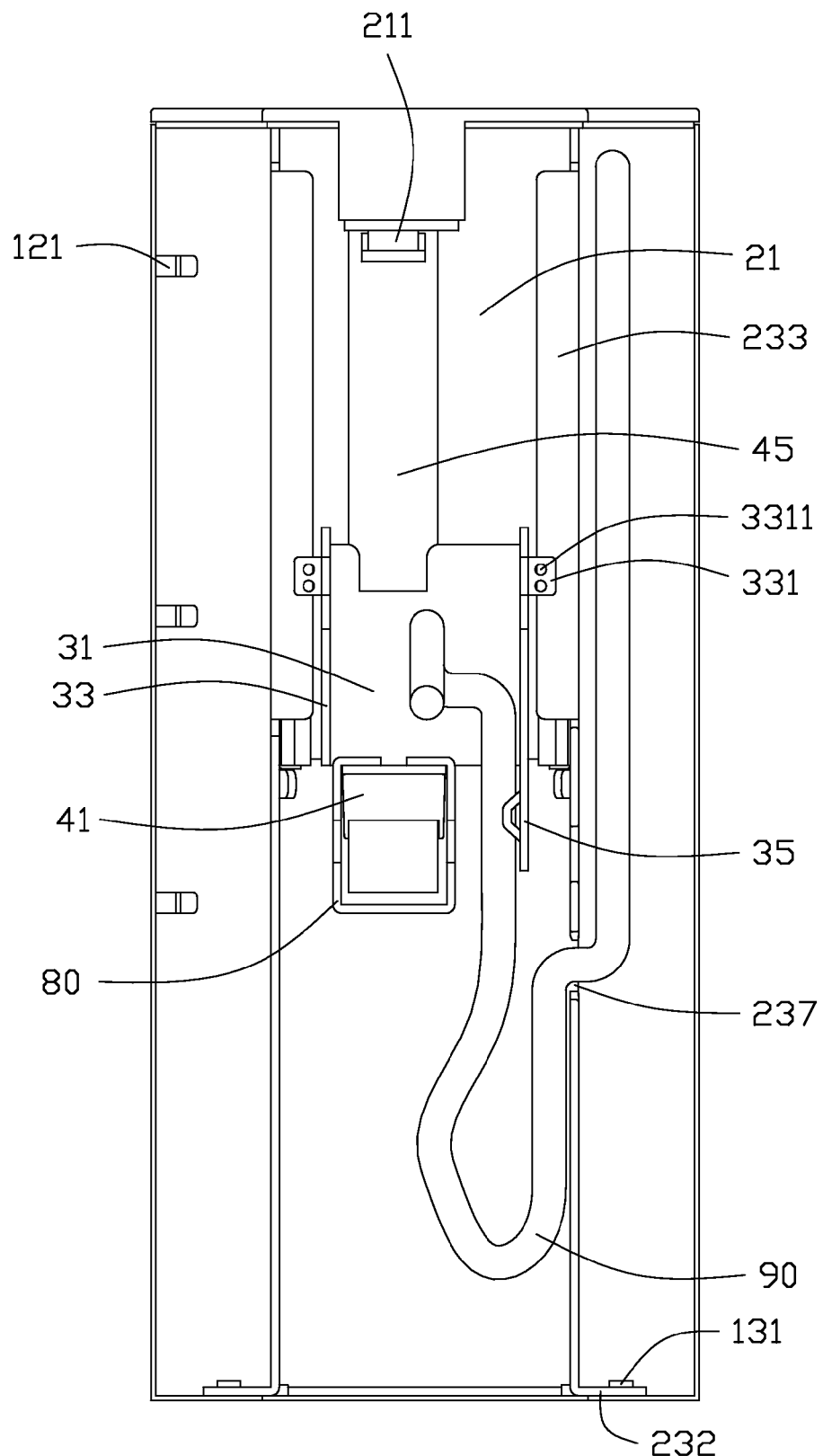
FIG. 3 is a front view of FIG. 2, and the display supporting mount and the cover are not shown.

Referring also to FIGS. 2-3, in assembly, the rail members 70 are fixed in the bracket 20. The first and second through holes 333, 353 of the moving member 30 are aligned with the inner rail holes 731, and a plurality of third fasteners (not shown) is fixed in the first and second through holes 333, 353 and the inner rail holes 731 correspondingly, so as to secure the moving member 30 with the inner rails 73 of the rail members 70.

The positioning member 80 is secured to the moving member 30. The base portion 41 of the extendable member 40 is enclosed in the positioning member 80, and the pins 411 are engaged in the piece slits 3113 of the moving member 30. The bottom wall clip 211 of the bracket 20 is engaged in the positioning opening 451 of the extendable member 40, so as to secure the extendable member 40 on the bracket 20.

The bracket 20 is placed in the chassis 10 such that the bottom wall flange holes 2131 and the sidewall piece holes 2322 of the bracket 20 are aligned with the side plate holes 131 of the chassis 10. A plurality of fourth fasteners (not shown) is fixed in the bottom wall flange holes 2131 and the sidewall piece holes 2322 correspondingly, thereby securing the bracket 20 in the chassis 10. The side plate tabs 121 are exposed out of the bracket 20. The cable 90 is placed in the chassis 10, and extends in the bracket 20 through the cutout 237 of the bracket 20.

The cover 50 is engaged in the chassis 10 and the cable 90 extends out of the cover 50 through the cover hole 515. The first and second securing portions 331, 351 of the moving member 30 extend out of the cover 50 through the first and second sliding slot 511, 513 respectively. The side plate tabs 121 of the chassis 10 are engaged in the lock holes of the cover 50 correspondingly, so as to secure the cover 50 on the chassis 10.

The support board 60 is placed on the cover 50 with the fastening holes 63 aligned with first and second fixing hole 3311, 3511. A plurality of fifth fasteners (not shown) is fixed in the fastening holes 63 and the first and second fixing holes 3311, 3511 correspondingly, so as to secure the support board 60 on the moving member 30. The support board 60 can be secured to the display device, and therefore the support board 60 and the display device can slide with the moving member 30. The cable 90 is capable of electrically connecting with electronic elements in the chassis 10 and the display device.

Figure 4:
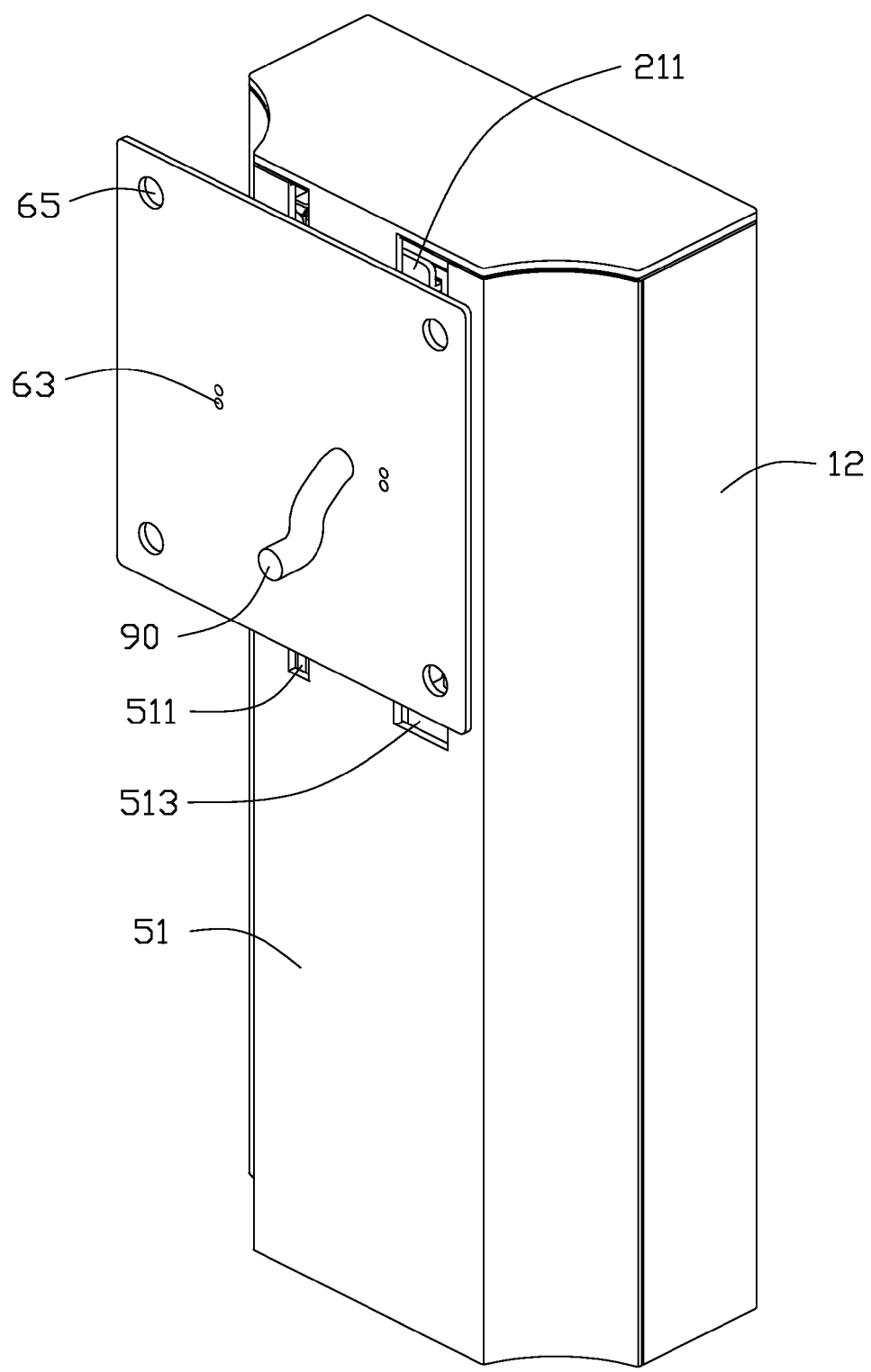
FIG. 4 is similar to FIG. 2, but showing the display supporting mount in a different position.
Figure 5:
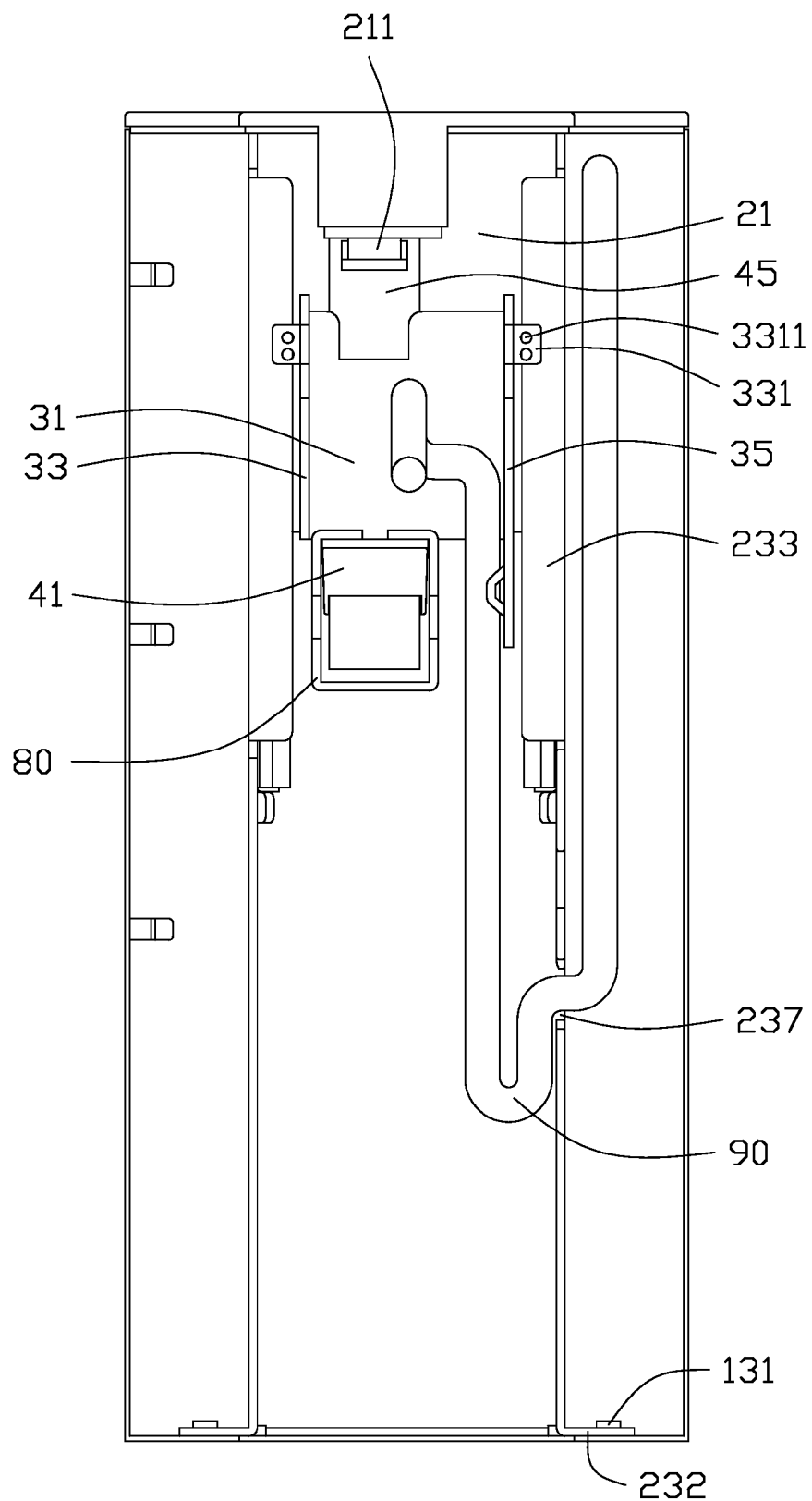
FIG. 5 is a front view of FIG. 4, and the display supporting mount and the cover are not shown.

In use, the moving member 30 can slide between a first position, where the moving member 30 engages with the bottom wall clip 211 of the bracket 20, and a second position (shown in FIGS. 2-3), where the inner rails 73 of the rail member 70 engage with the sidewall tabs 231 of the bracket 20. After the display device is secured to the display supporting mount 60, the weight of the display device, the display supporting mount 60, and the moving member 30 generally equals to the sum of the pulling force of the extendable member 40 and the friction between moving member 30 and the bottom wall 21 of the bracket 20. The moving member 30 can be thereby positioned in any position between the first and the second positions (shown in FIGS. 4-5).

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. An adjustable apparatus comprising:
   a bracket;
   an extendable member comprising a base portion and a resilient tape portion attached to the base portion, the tape portion secured to the bracket;
   a moving member attached on the base portion;
   a display supporting mount secured to the moving member for being secured to a display device, the display supporting mount being movable with the moving member; and
   a cover attached to the bracket, the cover defining a sliding slot, and the display supporting mount being secured to the moving member via the sliding slot.

2. The adjustable apparatus of claim 1, wherein the bracket comprises a bottom wall; a bottom wall clip is located on the bottom wall; the tape portion defines a positioning opening receiving the bottom wall clip.

3. The adjustable apparatus of claim 2, wherein the bracket further comprises two sidewalls located on the bottom wall; a rail member comprises an outer rail secured to each sidewall of the bracket, and an inner rail slidably attached to the outer rail; the moving member is secured to the inner rail.

4. The adjustable apparatus of claim 3, wherein a sidewall tab is located on each sidewall of the bracket, and capable of abutting on the inner rail to limit a sliding distance of the inner rail.

5. The adjustable apparatus of claim 1, wherein a part of the tape portion of the extendable member is positioned between the bracket and the moving member.

6. The adjustable apparatus of claim 5, wherein a positioning member is secured to the moving member; the base portion of the extendable member is enclosed by the positioning member.

7. The adjustable apparatus of claim 5, wherein a pin is located on the base portion of the extendable member; the moving member defines a slit for receiving the pin.

8. The adjustable apparatus of claim 1, wherein the display supporting mount defines a board hole; the cover defines a cover hole; the board hole and the cover hole are configured to receive a cable electronically connected to the display device.

9. The adjustable apparatus of claim 1, further comprising a chassis receiving the bracket and the cover.

10. The adjustable apparatus of claim 9, wherein the chassis comprises a bottom plate and two side plate located on the bottom plate; a plurality of side plate tabs is located on each side plate; the side plate tabs are exposed out of the bracket when the bracket is secured to the chassis, and engage with the cover when the cover is secured to the chassis.

11. An adjustable apparatus comprising:
    an extendable member comprising a base portion and a resilient tape portion; one end of the tape portion attached to the base portion, and the other end of the tape portion being fixed; the base portion being moveable relative to the other end of the tape portion;
    a moving member abutting on the base portion, the moving member being slidable downwards to press the base portion so as to resiliently elongate the tape portion, and slidable upwards so that the tape portion rebounds to shorten;
    a display supporting mount configured for being secured to a display device, the display supporting mount being movable with the moving member; and
    a rail member comprising an outer rail and an inner rail, the outer rail secured to the bracket, the inner rail slidably attached to the outer rail, and the moving member is secured to the inner rail.

12. The adjustable apparatus of claim 11, further comprising a bracket, the bracket comprising a bottom wall, a bottom wall clip being located on the bottom wall, the other end of the tape portion defines a positioning opening receiving the bottom wall clip.

13. The adjustable apparatus of claim 12, wherein the bracket further comprises two sidewalls located on the bottom wall; and the outer rail is secured to one of the two sidewalls.

14. The adjustable apparatus of claim 13, wherein a sidewall tab is located on the one of the two sidewalls of the bracket, and capable of abutting on the inner rail to limit a sliding distance of the inner rail.

15. The adjustable apparatus of claim 11, wherein a part of the tape portion of the extendable member is positioned between the bracket and the moving member.

16. The adjustable apparatus of claim 15, wherein a positioning member is secured to the moving member; the base portion of the extendable member is enclosed by the positioning member.

17. The adjustable apparatus of claim 15, wherein a pin is located on the base portion of the extendable member; the moving member defines a slit for receiving the pin.

18. The adjustable apparatus of claim 11, further comprising a cover attached to the bracket, the cover defining a sliding slot for exposing the moving member, the display supporting mount being secured to the moving member via the sliding slot.

19. The adjustable apparatus of claim 18, further comprising a chassis receiving the bracket and the cover, the chassis comprising a bottom plate and two side plate located on the bottom plate, a plurality of side plate tabs being located on each side plate, the side plate tabs being exposed out of the bracket when the bracket is secured to the chassis, and engaging with the cover when the cover being secured to the chassis.

* * * * *